US009475210B2

(12) United States Patent
Koski

(10) Patent No.: US 9,475,210 B2
(45) Date of Patent: Oct. 25, 2016

(54) APPARATUS AND RELATED METHODS FOR WET SAWING

(71) Applicant: Thomas Robert Koski, Finlayson, MN (US)

(72) Inventor: Thomas Robert Koski, Finlayson, MN (US)

( * ) Notice: Subject to any disclaimer, the term of this patent is extended or adjusted under 35 U.S.C. 154(b) by 0 days.

(21) Appl. No.: 14/667,036

(22) Filed: Mar. 24, 2015

(65) Prior Publication Data

US 2016/0279827 A1 Sep. 29, 2016

(51) Int. Cl.
*B28D 7/02* (2006.01)
*F16K 49/00* (2006.01)

(52) U.S. Cl.
CPC ........ *B28D 7/02* (2013.01)

(58) Field of Classification Search
CPC ....... B28D 7/02; F16K 49/00; F16K 49/002; B01D 35/027; C02F 1/32; B63B 13/00; F03B 11/02; F03B 11/00; G01F 1/46
USPC .......... 125/21; 137/334, 341, 565.01–565.36
See application file for complete search history.

(56) References Cited

U.S. PATENT DOCUMENTS 3,380,080 A * 4/1968 Farrell .......... A47K 3/022 137/341
3,457,944 A * 7/1969 Cary .......... B01D 61/28 137/341
3,828,478 A * 8/1974 Bemis .......... B24C 5/02 451/90
4,779,603 A 10/1988 Crocetti
4,979,571 A * 12/1990 MacDonald .......... A62C 3/0242 169/14
5,046,529 A * 9/1991 Corella .......... E03B 11/06 137/216.1
5,477,844 A 12/1995 Meister
6,152,707 A * 11/2000 Alberg .......... E03B 11/06 417/423.3
6,186,165 B1 * 2/2001 Damiani .......... B60R 15/00 137/334
6,363,548 B1 * 4/2002 Kuo .......... A47K 3/022 4/541.1
7,353,548 B2 * 4/2008 Bartosik .......... A61H 33/6063 4/541.1
7,434,792 B2 * 10/2008 Nagasaka .......... A61H 33/02 261/104
D616,525 S * 5/2010 Easley .......... D23/209
7,905,368 B1 * 3/2011 Christensen .......... B65D 90/205 220/565
8,092,506 B2 * 1/2012 Haase .......... A47K 3/022 601/16
8,354,617 B2 1/2013 Lee
8,407,822 B2 * 4/2013 Park .......... A61H 35/006 4/451
2007/0045159 A1 * 3/2007 Lee .......... C02F 9/005 210/86
2011/0139259 A1 * 6/2011 Nagata .......... F24D 3/082 137/1
2012/0216445 A1 * 8/2012 Aquilina .......... A01M 7/0042 43/132.1

FOREIGN PATENT DOCUMENTS

EP 1334790 A2 8/2003
EP 2596891 A1 5/2013
WO WO 2010068148 A1 * 6/2010 .......... B28D 7/02

* cited by examiner

*Primary Examiner* — George Nguyen
(74) *Attorney, Agent, or Firm* — Patterson Thuente Pedersen, P.A.

(57) ABSTRACT

A wet saw system and related methods of use for supplying a cooling water stream in construction locations. The wet saw system includes a water supply system for supplying the cooling water stream when ambient temperatures are at, below or approaching freezing conditions. The water supply system includes a unitary housing defining storage and electrical compartments. The storage compartment defines a water storage tank that includes a storage inlet, a storage outlet and a heater assembly. The electrical compartment encloses a control assembly, a pumping assembly and a power supply. The pumping assembly is fluidly connected to the at least one storage outlet and supplies a pressurized water stream to a system outlet that is externally accessible on the unitary housing. In the absence of available power sources, the power supply can power the heater assembly so as to be off-line with respect to external utilities.

20 Claims, 8 Drawing Sheets

APPARATUS AND RELATED METHODS FOR WET SAWING

FIELD OF THE INVENTION

The present invention is directed to wet sawing. More specifically, the present invention is directed to a wet sawing system for use in cold weather climates and environments in which dust generation is preferably avoided by providing a continuous amount of cooling water that can be used to cool a wet saw blade during wet sawing.

BACKGROUND OF THE INVENTION

The use of wet saws in the masonry industry is well known. Generally, a wet saw uses an application specific saw blade to cut grooves or lines within cement, cement-based products, concrete, brick, clay, asphalt and similar materials. During the cutting process, water is generally sprayed on the saw blade to cool the blade and prevent overheating/warping of the blade. In addition, the water serves to prevent dust and other debris from accumulating in the air that can be hazardous to both the user and other individuals working in the vicinity of the sawing operation.

In many construction environments, utilities, for example, a continuous source of water and/or electrical service, may not be conveniently and readily available for use with a wet saw system. In some instances, this may require bringing a water source to the construction site. Unfortunately, providing an adequate and continuous supply of water can be made even more difficult in environments that experience below freezing or winter-like conditions, especially when water must be brought to and stored on-site, often outside and exposed to freezing conditions.

SUMMARY OF THE INVENTION

A wet saw system of the present invention addresses the issues associated with water availability in below freezing or winter-like conditions. Generally, the wet saw system comprises a water supply system and a wet saw, wherein the water supply system includes a water storage tank, a control assembly and a pumping assembly that can supply an adequate water supply at temperatures above freezing. In one representative embodiment, the water supply system comprises a unitary housing defining a water holding tank and an electrical compartment that are fluidly isolated from each other. Generally, the water holding tank can comprise a storage inlet and at least one storage outlet. The electrical compartment generally houses components comprising the control assembly and the pumping assembly. The pumping assembly is generally fluidly connected to the at least one storage outlet and can supply a pressurized water stream to a system outlet that is externally accessible on the unitary housing. The pumping assembly generally comprises a motorized pump that is selectively operated by the control assembly. The control assembly generally includes a control member, a heater and a power source. The control member can comprise one or more switches or buttons for selectively operating the motorized pump and/or the heater. The heater generally comprises an immersion heater that is mounted within the water holding tank. The power source generally comprises a battery, for example, one or more twelve volt batteries for selectively powering the motorized pump as directed by the control member. The power source can further include a battery charger for recharging the battery by connecting to an external power source, for example, a generator or utility connection, using an electrical connector mounted externally to the unitary housing. In some embodiments, the heater can operate off an available utility supply, for example, a generator or available electrical line, while in other embodiments, the heater can be powered by one or more batteries of the power source such that the water supply system can be operated completely off-line from any external utility connections.

In one representative aspect, the present invention is directed to a wet saw system that includes a water supply system and a wet saw. The wet saw system provides a constant supply of water at temperatures above freezing, even in construction environments that lack readily available utilities including water and electricity. All the components necessary to providing the constant supply of a water at temperatures above freezing are onboard the water supply system such the wet sawing process can be performed in almost any location and environments, including where ambient temperatures are at, below or approaching freezing, i.e. 32° F.

In another aspect, the present invention is directed to a method for wet sawing that provides a constant supply of water to a wet saw, even when ambient temperature is at, below or approaching freezing, i.e. 32° F. Generally, the invention comprises filling a storage portion of a water supply system with a volume of water. Depending upon the ambient temperature, the method can further comprise heating the volume of water within the storage portion using a heater assembly such as, for example, an immersion heater. The method can further comprising pumping water from the storage portion using a pumping assembly mounted within an electrical compartment of the water supply system to at least one outlet connector on the water supply system. The method can further comprise powering the pumping assembly and/or the heater assembly with an onboard power supply, for example, one or more twelve volt batteries mounted in the electrical compartment. The method can further comprise recharging the onboard power supply through connection to an external power source, wherein said recharging can occur before, during and/or after water is pumped to the wet saw. The method can further comprise positioning the water supply system generally proximate to a wet saw usage location even in the absence of any utility connections, i.e., water or electrical availability.

In another aspect, the present invention is directed to a unitary system for supplying a water stream to a wet saw in environments having ambient temperatures at, below or approaching freezing.

In another aspect, the present invention is directed to a unitary system for supplying a water stream to a wet saw, wherein the wet saw is used in a location absent any utility connections including water and electrical connections.

The above summary of the various representative embodiments of the invention is not intended to describe each illustrated embodiment or every implementation of the invention. Rather, the embodiments are chosen and described so that others skilled in the art can appreciate and understand the principles and practices of the invention. The figures in the detailed description that follow more particularly exemplify these embodiments.

BRIEF DESCRIPTION OF THE DRAWINGS

The invention can be completely understood in consideration of the following detailed description of various embodiments of the invention in connection with the accompanying drawings, in which.

Figure 1:
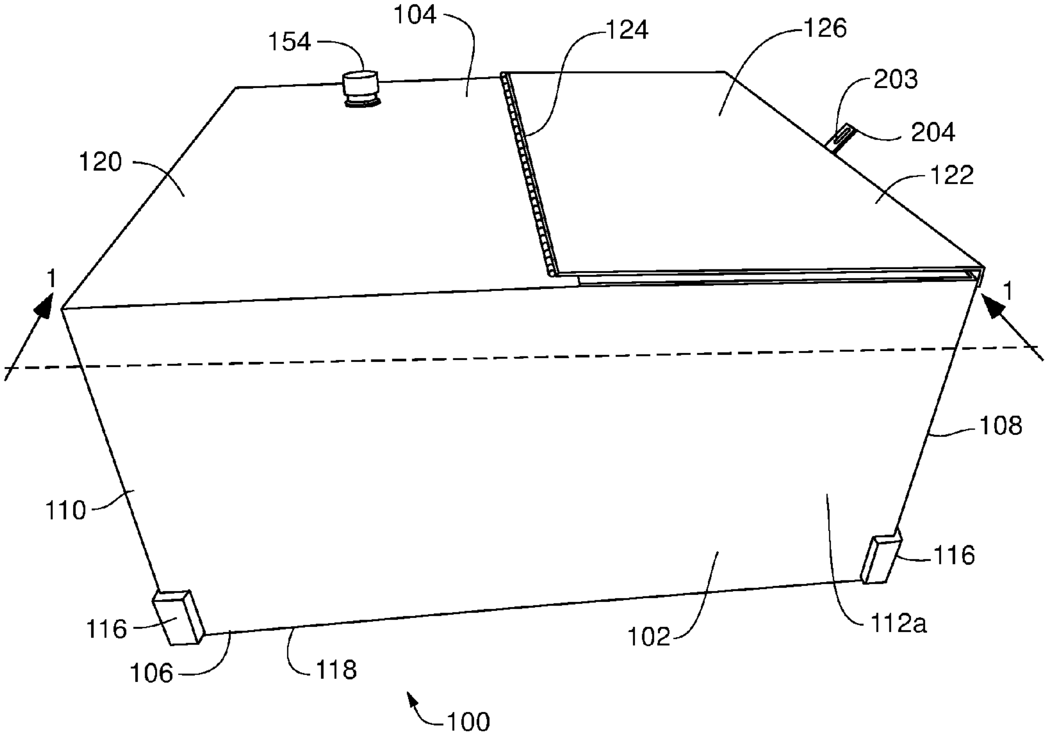
FIG. 1 is a side perspective view of a water supply system for a wet saw according to an embodiment of the present invention.
Figure 2:
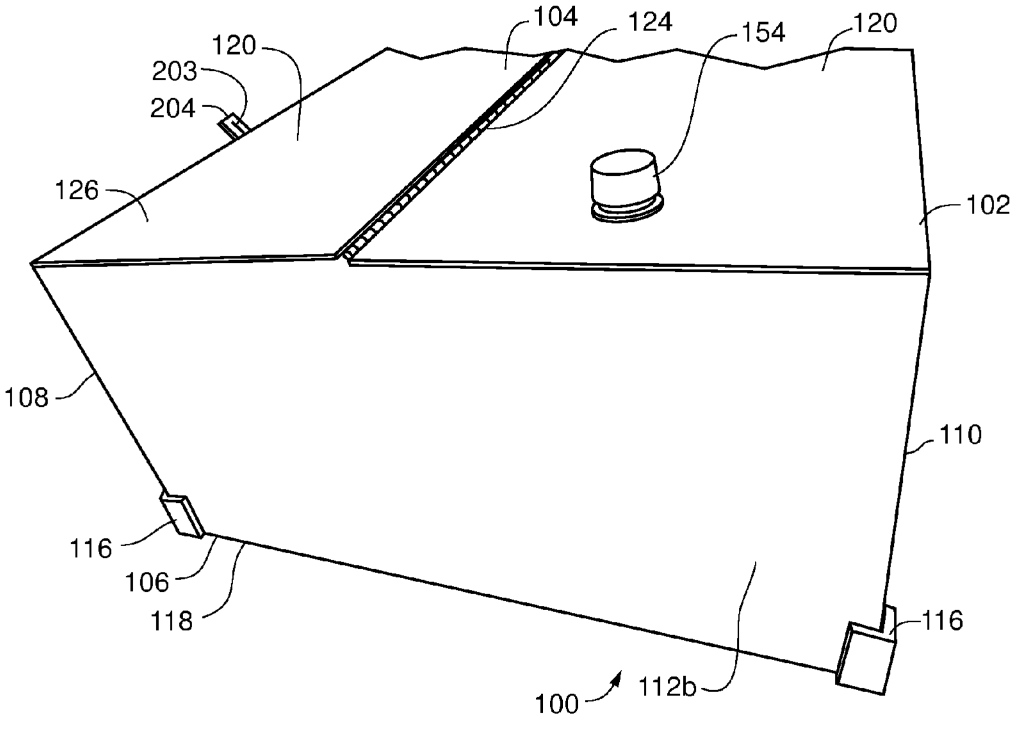
FIG. 2 is a side perspective view of the water supply system of FIG. 1.
Figure 3:
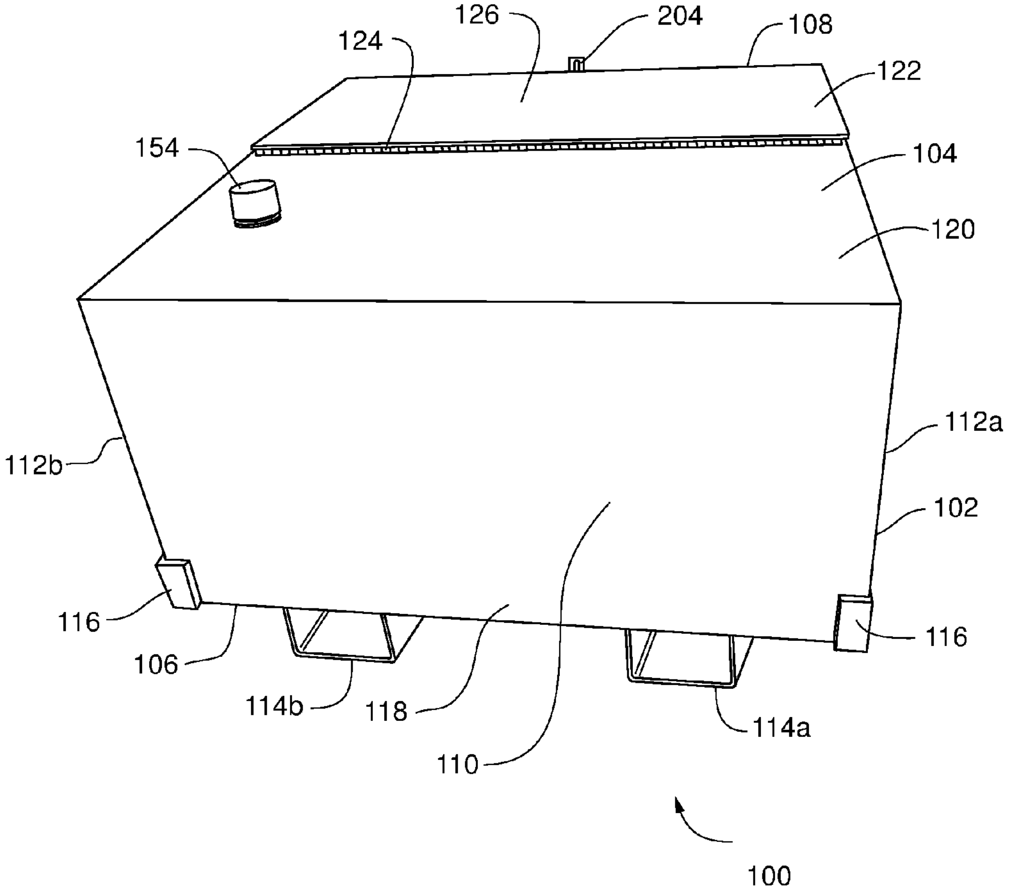
FIG. 3 is a rear perspective view of the water supply system of FIG. 1.
Figure 4:
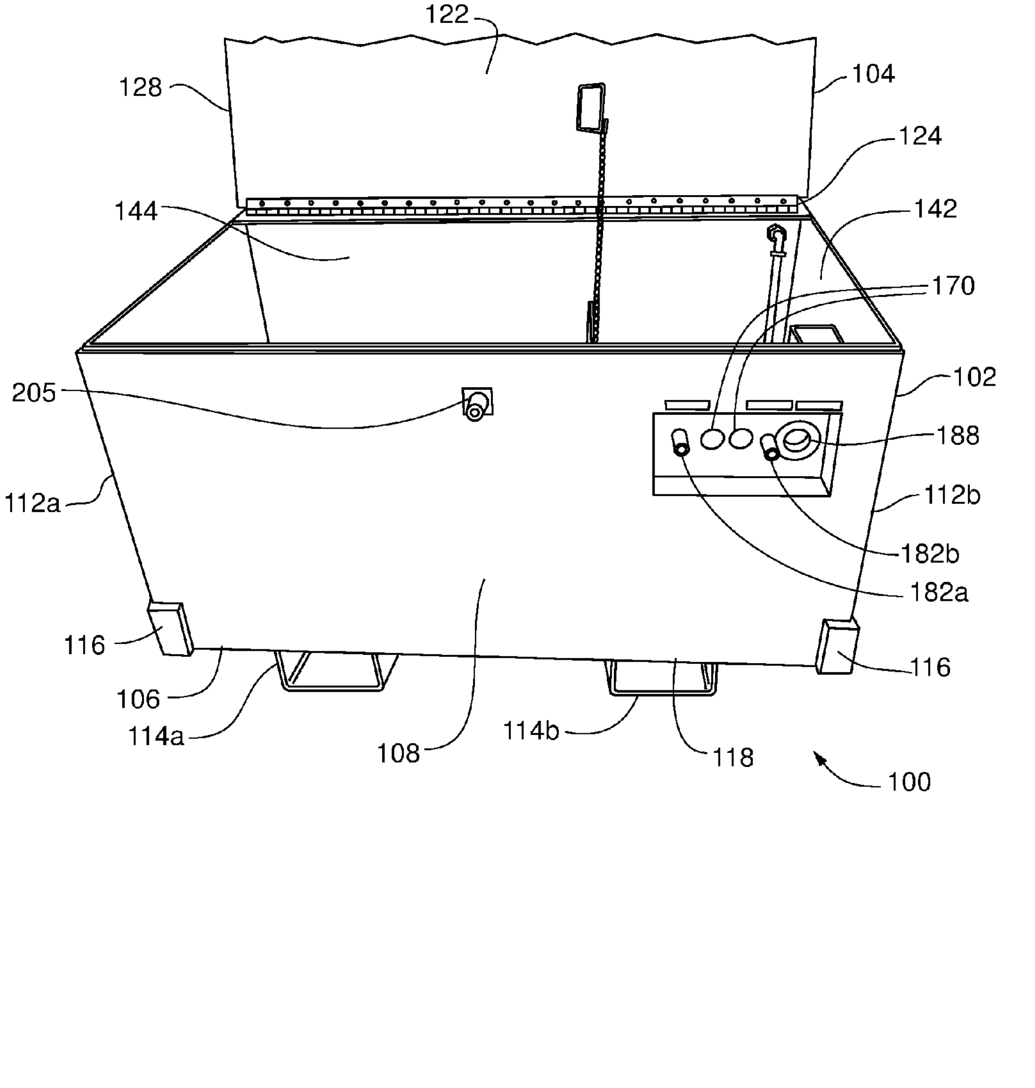
FIG. 4 is a front perspective view of the water supply system of FIG. 1 with a cover in an open position.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION OF THE DRAWINGS

Referring now to FIGS. 1, 2, 3 and 4, a water supply system 100 of the present invention generally comprises a unitary housing 102. Unitary housing 102 can be fabricated of suitable materials including various metals such as, for example, stainless steel, painted carbon steel and aluminum as well as molded polymeric materials such as polyethylene, polypropylene and the like. In some instances, it may be advantageous to fully or partially insulate the unitary housing 102 based upon expected environmental conditions. Unitary housing 102 generally defines a top surface 104, a bottom surface 106, a front wall 108, a rear wall 110 and a pair of side walls 112*a*, 112*b*. Bottom surface 106 can include a pair of lifting brackets 114*a*, 114*b* that allow the unitary housing 102 to be conveniently loaded and unloaded from a truck as well as for placement on a work site using a conventional fork lift, skid loader or pallet jack. Unitary housing 102 can include a plurality of corner support members 116 located at one or more of the corner defined by the bottom surface 106, front wall 108, rear wall 110 and side walls 112*a*, 112*b*. Corner support members 116 can provide structural support to the unitary housing 102 while also extending a housing perimeter 118 defined by the unitary housing 102 such that unintentional collisions that occur on a job site are more likely to impact the extended corner support members 116 as opposed to the various walls that define the unitary housing 102. Top surface 104 generally defines a fixed tank cover 120 and a rotatable access cover 122. Rotatable access cover 122 includes a hinge assembly 124 mounted between the side walls 112*a*, 112*b*. Rotatable access cover 122 is capable of operating between a closed disposition 126 and an open disposition 128.

Figure 5:
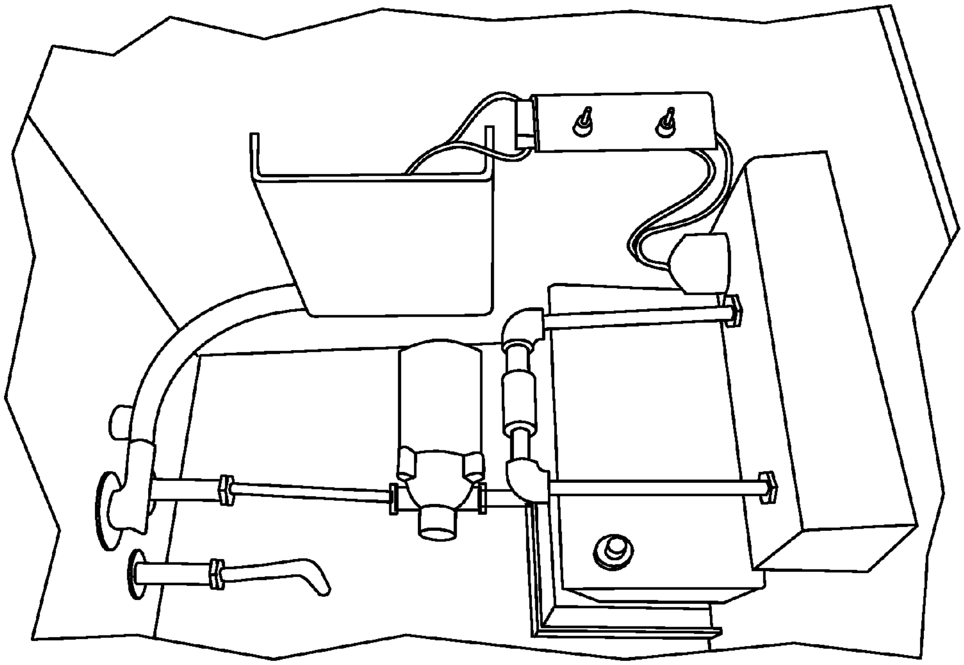
FIG. 5 is a top view of an electrical compartment according to an embodiment of the present invention.
Figure 6:
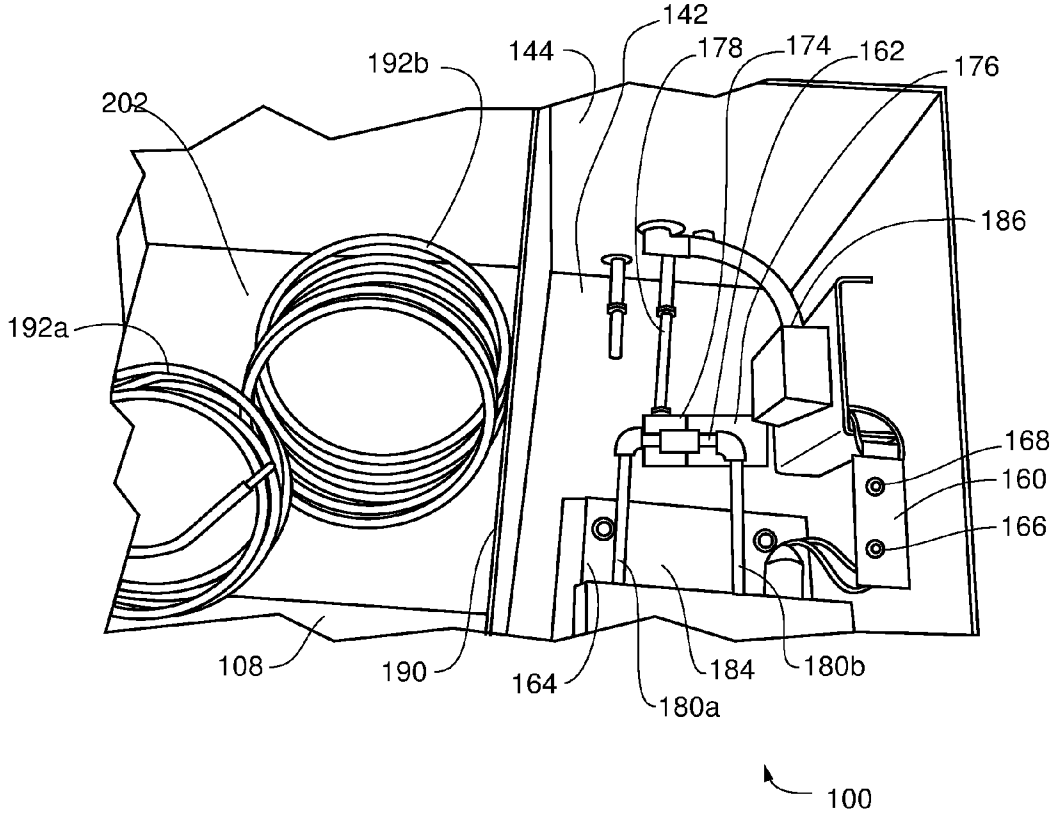
FIG. 6 is a top view of an electrical compartment and a storage compartment according to an embodiment of the present invention.
Figure 7:
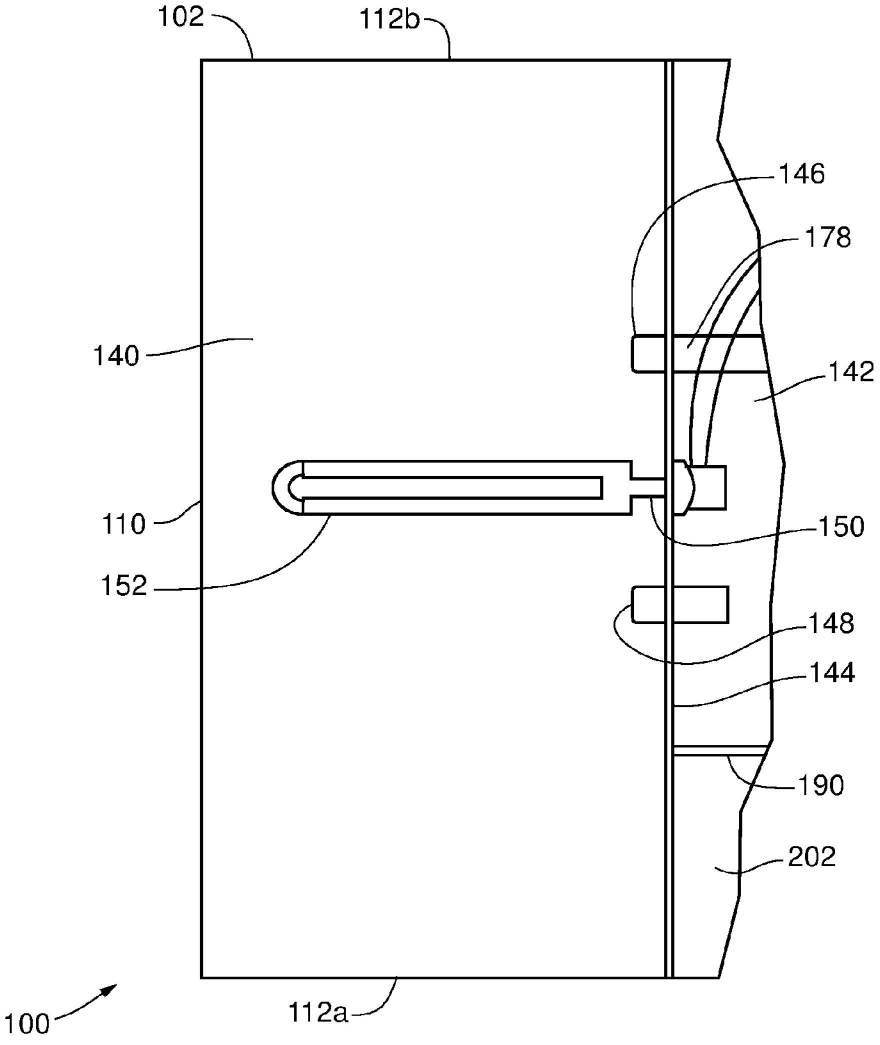
FIG. 7 is a partial, top section view of the water supply system of FIG. 1 illustrating a water storage tank according to an embodiment of the present invention.

As shown in FIGS. 5, 6 and 7, unitary housing 102 defines an interior comprising a water holding tank 140 and an electrical compartment 142, with the water holding tank 140 and electrical compartment 142 being fluidly sealed from one another with an interior tank wall 144. Mounted within the interior tank wall 144 is a tank outlet connection 146, a tank drain connection 148 and a heater connector 150. Mounted within water holding tank 140, and preferably, proximate the bottom surface 106, is a heating element 152 such as, for example, an immersion heater that is operably connected to the heater connector 150. Heating element 152 can be sized with respect to heating output, for example, 100, 500 or 1,000 watts or even larger, according to a volume of the water holding tank and/or an expected heat output necessary and expected based on ambient temperature conditions. Heating element 152 can comprise a resistance style heater capable of operating at voltages such as 12 volt, 24 volt, 110 volt and 220 volt. In some embodiment, heating element can comprise two or more heating elements, wherein a first element is capable of operating at 12 or 24 volts while a second element is capable of operating at 110 or 220 volts. Water holding tank 140 further comprises a tank inlet 154. Water holding tank 140 can be sized based upon both the number of wet saws being supplied by the water supply system 100 as well as the cooling requirements for each wet saw. As such, unitary housing 102 can be fabricated in a range of sizes and shapes such that the water holding tank 140 can have a variety of water holding capacities. Generally, water holding tank 140 can have capacities of 20 gallons, 100 gallons, 200 gallons or even larger. Generally, the capacity of the water holding tank 140 is only limited by lifting and heating capacity. Typically, water holding tank 140 will have enough water capacity for at least one full day of wet sawing operations.

Referring to FIGS. 5 and 6, electrical compartment 142 generally defines a fluidly sealed interior space for mounting various electrical components including, for example, a control assembly 160, a pump assembly 162 and a power supply 164. The control assembly 160 can comprise one or more switches, for example, a pump switch 166 and a heater switch 168. Control assembly 160 can further comprise one or more operational lights 170, preferably on an exterior panel 172, that indicate an on/off status of the pump assembly 162 and the heating element 152. Pump assembly 162 generally comprises a pump 174, a motor 176, an inlet conduit 178 and an outlet conduit 180. Outlet conduit 180 can be split into a plurality of outlet conduits 180*a*, 180*b* that allow the pump assembly 162 to supply two wet saws simultaneously. Outlet conduits 180*a*, 180*b* can be fluidly connected to a pair of outlet connectors 182*a*, 182*b* for attachment of water hoses 184*a*, 184*b*. In a preferred embodiment, outlet connectors 182*a*, 182*b* are mounted in the exterior panel 172 and comprise quick-connect style fittings including a check valve such that absent connection to a water hose, the outlet connectors are biased to a closed orientation. Power supply 164 generally comprises one or more batteries 184 such as, for example, one or more twelve volt deep-cycle batteries to provide a 12 or 24 volt power supply based on wiring configuration. The batteries 184 are wired to the pump switch 166 such that when the pump switch 166 is switched to an on position, power is supplied to the motor 176. Power supply 164 can further comprise a battery charger 186 including an external power receptacle 188 mounted on the exterior panel 172. Battery charger 186 can comprise, for example, a 5 amp battery charger that is designed for charging deep-cycle batteries. Battery charger 186 is generally wired to the battery 184 such that the battery charger 186 can recharge the battery 184 overnight or at times when the water supply system 100 is not in use. External power receptacle 188 is generally configured for connection to a 110 or 220 volt power source such as, for example, a traditional utility power supply or an on-site generator, for operating the battery charger 186 or for powering the heating element 152. Alternatively, power supply 164 can supply power to both the heating element 152 and the motor 176 such that the water supply system 100 can be operated completely off-line from any utility connections at a point of use.

With reference to FIGS. 6 and 7, unitary housing 142 can be configured with a divider wall 190 extending between the interior tank wall 144 and the front wall 108 to further define a storage compartment 202. Items associated with operating the water supply system 100 for example, water hoses 192*a*, 192*b*, tools such as wrenches and screwdrivers and even small hand-held wet saws, can be conveniently stored and secured within the storage compartment 202. Rotatable access cover 122 can further include a latch assembly 203 including a latch member 204 and a latch bracket 205 for receiving a combination or key-style lock such that rotatable access cover 122 can be locked in the closed disposition 126 if the water supply system 100 is left on-site overnight or is otherwise unsupervised.

In operation, a user would generally place the water supply system 100 in a truck or van using the lifting brackets 114*a*, 114*b*, whereby the water supply system 100 would be transported to a construction site and then positioned proximate a sawing locating by removing the water supply system 100 from the truck using the lifting brackets 114*a*, 114*b*. Either prior to transporting the water supply system 100 to the job site or at the job site if water is available, the water holding tank 140 is filled with water through the tank inlet 154. Preferably, the water holding tank 140 is filled almost full but at least to a point where the heating element 152 is fully submerged. During transportation of the water supply system 100, heating element 152 can be turned on with heater switch 168, and powered by the power supply 164, to begin preheating or maintaining the water temperature during transportation if warranted by outside temperature conditions.

With the water supply system 100 placed in the proper position at a point of use and the water holding tank 140 filled with water, the user can turn on the heating element 152 using the heater switch 168. Depending upon the availability of electrical power, the user can connect to an available utility source, i.e. a power line or generator, using the power receptacle 188 to power the heating element 152 or alternatively, the heating element 152 can be operated by the power supply 164 to run in a completely off-line mode in which no external utility connections are required for operation of the water supply system 100. In embodiments in which the heating element 152 comprises two or more heating elements, a first heating element can be configured to operate off the power supply 164 while a second heating element can be powered by an external power source connected to the power receptacle 188. The user can leave the heating element 152 to run overnight, if the ambient temperatures are at or below freezing such that water in the water holding tank 140 is preheated prior to use. In one preferred embodiment, the heating element 152 is used to heat the water in the water holding tank 140 to a temperature of approximately 60° F., though it will be understood that operation of the water supply system 100 only requires that the water have a temperature above freezing. Water holding tank 140 can include a thermometer to display water temperature or alternatively, a thermocouple and temperature display could be used to give an indication of the water temperature. In some more advanced embodiments, the control assembly 160 could make use of a controller, for example, a Programmable Logic Controller or a microprocessor based controller, to allow for temperature cycling of the heating element 152 to heat the water in the water holding tank 140 to a desired temperature through the use of a thermocouple-style input to the controller. In summer conditions or in environments where freezing is not an issue, it may be that the heating element 152 is not used and instead, the water supply system 100 simply serves as a cooling water source in locations where water is not readily available. Furthermore, it will be understood that locations that experience severe winter conditions may require a larger power supply 164 and/or heating element 152 than locations that experience moderate or infrequent stretches of winter weather.

Once the water within the water holding tank 140 is heated to a desired temperature and the one or more water hoses 184*a*, 184*b* have been connected to their respective outlet connector 182*a*, 182*b* for supplying water to one or more wet saws 210, the user can switch the pump switch 166 to turn on the motor 176. Water from the water holding tank 140 is drawn out of the tank outlet connection 146, through the inlet conduit 178 and into the pump 174. Pressurized water exits the pump 174 from the outlet conduit 180 where it can supply the outlet conduits 180*a*, 180*b* and flow into the water hoses 192*a*, 192*b* though the outlet connectors 182*a*, 182*b*. Typically, water is supplied from the pump 174 to the one or more water hoses 192*a*, 192*b* at flow rates of less than 1 gallon/minute and at pressures of 50-70 psi.

When the wet sawing operation is complete, the user simply turns off the pump switch 166 to stop the pump 174. The user can also turn off the heater switch 168 if heating is no longer desired, or may leave the heater in operation if there is a potential risk of freezing within the water holding tank 140. If the wet sawing operation is complete and the water supply system 100 is to be moved from or around the job site, the user may also elect to drain the water holding tank 140 through the tank drain connection 148. At this time, the user can also connect a power source to the external power receptacle 188 such that the battery charger 186 can recharge the battery 184 for future use.

Figure 8:
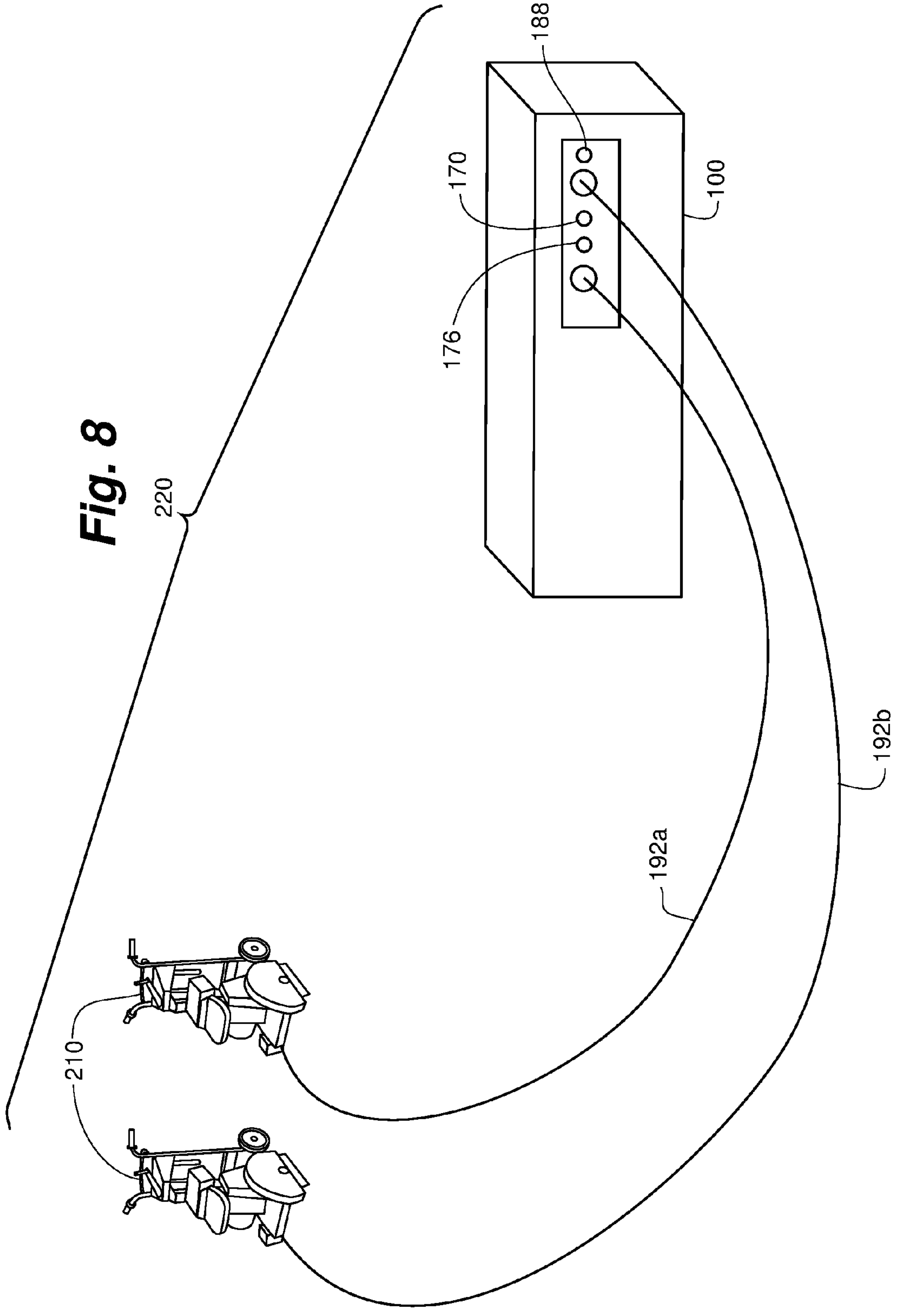
FIG. 8 is a perspective view of a wet sawing system according to an embodiment of the present invention.

With reference to FIG. 8, a wet saw system 220 according to an embodiment of the invention can comprise water supply system 100, one or more water hoses 184*a*, 184*b* and one or more wet saws 210. As previously described, wet saw system 200 allows for wet sawing in locations where utilities, i.e. electricity and water, are not readily available and temperatures are at, below or approaching freezing. By including an on-board power supply 164, the water supply system 100 is fully capable of supplying cooling water for proper wet saw operation even in the absence of external utility connections, i.e., water and power connection, at a job-site.

Although specific examples have been illustrated and described herein, it will be appreciated by those of ordinary skill in the art that any arrangement calculated to achieve the same purpose could be substituted for the specific examples shown. This application is intended to cover adaptations or variations of the present subject matter. Therefore, it is intended that the invention be defined by the attached claims and their legal equivalents.

The invention claimed is:

1. A water supply system for a wet saw operation, comprising:

a unitary tank defining a water storage tank and an electrical compartment, the electrical compartment including an on-board power supply, a control assembly and a pump assembly, wherein the on-board power supply supplies power to operate the pump assembly at the direction of the control assembly, the pump assembly pumping cooling water from within the water storage tank to a point of use, and wherein a heating element is submerged in cooling water within the water storage tank, the heating element being operated at the direction of the control assembly.

2. The water supply system of claim 1, wherein the on-board power supply comprises one or more 12 volt batteries.

3. The water supply system of claim 2, wherein the on-board power supply comprises a battery charger, said battery charger including an external power receptacle mounted on an exterior of the unitary tank for facilitating connection to an external power source.

4. The water supply of claim 3, wherein the external power source powers the heating element at the direction of the control assembly.

5. The water supply of claim 1, wherein the on-board power supply powers the heating element at the direction of the control assembly.

6. The water supply system of claim 1, wherein the unitary tank comprises a dividing wall for separating the electrical compartment from a storage compartment.

7. The water supply system of claim 1, wherein the unitary tank comprises a pair of lifting brackets on a bottom surface of the unitary tank, said lifting brackets adapted for lifting by a fork lift, skid loader or pallet jack.

8. The water supply system of claim 1, wherein the unitary tank comprises a top surface, said top surface defining a fixed tank cover above the water storage tank and a rotatable access cover over the electrical compartment.

9. The water supply system of claim 8, wherein the fixed tank cover includes a tank inlet for filling the water storage tank with the cooling water.

10. The water supply system of claim 8, wherein the rotatable access cover further comprises a hinge assembly allowing the rotatable access cover to rotatably shift between a closed disposition and an open disposition relative to the electrical compartment.

11. The water supply system of claim 8, wherein the rotatable access cover further comprises a latch assembly for locking the rotatable access cover in the closed disposition.

12. The water supply system of claim 1, wherein an inlet conduit fluidly connects the water storage tank with the pump assembly, and an outlet conduit supplies a pressurized cooling water flow from the pump assembly to at least one outlet connector.

13. The water supply system of claim 12, wherein the outlet conduit comprises a pair of outlet conduits that are fluidly connected to a pair of outlet connectors.

14. A wet sawing system, comprising the water supply system of claim 1.

15. The wet sawing system of claim 14, further comprising:

at least one water hose fluidly connected to the pump assembly, and at least one wet saw fluidly connected to the at least one water hose.

16. A method for wet sawing, comprising:

providing a water supply system defining a water storage tank and an electrical compartment:

filling at least a portion of the water storage tank with water;

heating the water with a heating element located in the water storage tank, the heating element operating at the direction of a control assembly in the electrical compartment;

pumping water from the storage tank to an outlet connector using a pump assembly located in the electrical compartment, the pump assembly operating at the direction of the control assembly; and powering the pump assembly with an on-board power supply in the electrical compartment.

17. The method of claim 16, further comprising:

attaching a water hose to the outlet connector, wherein the water hose supplies water to a wet saw.

18. The method of claim 16, further comprising:

recharging the on-board power supply with a battery charger, wherein the battery charger is electrically connected to an external power source through an external power receptacle mounted on the electrical compartment.

19. The method of claim 18, further comprising:

powering the heating element with the external power source as electrically connected to the external power receptacle.

20. The method of claim 16, further comprising:

positioning the water supply system at a job site, wherein the job site lacks utility connections including a water source and a power source; and powering the heating element with the on-board power supply.

* * * * *